Jan. 5, 1926.

G. BUELNA 1,568,720

AUTOMATIC FLUID CONTROL

Filed August 25, 1924

INVENTOR:
GUADALUPE BUELNA.
By Anton Hochner
Atty.

Patented Jan. 5, 1926.

1,568,720

UNITED STATES PATENT OFFICE.

GUADALUPE BUELNA, OF SANTA BARBARA, CALIFORNIA.

AUTOMATIC FLUID CONTROL.

Application filed August 25, 1924. Serial No. 733,921.

*To all whom it may concern:*

Be it known that I, GUADALUPE BUELNA, a citizen of the United States, residing at Santa Barbara, county of Santa Barbara, and State of California, have invented a certain new and useful Automatic Fluid Control, of which the following is a specification.

My invention relates to an automatic shut-off means for fluid conveying systems, and it has especial reference to a device for regulating the period of time during which a fluid may discharge.

Objects of the invention are to provide an effective arrangement in which the flow of water or other fluid is automatically interrupted after a definite predetermined quantity has been delivered through the system; to provide a device in which the quantity to be discharged may be predetermined, and to provide a simple control which may be attached to any fluid conveying system.

The invention, while chiefly applicable to sprinkling systems, is usable in many other instances. In those elaborate systems installed for sprinkling extensive estates, where a great number of individual sprinklers are used in relative close proximity to irrigate the lawn, it is not only desirable for the economical conservation of water to prevent an excess delivery of water, but necessary for effective irrigation to regulate the delivery of water that those portions of the soil which are in greatest need of water be supplied as required. The purpose of the present invention therefore is to provide means by which indiscriminate irrigation may be obviated and water distribution concentrated and localized as required by the condition of the ground.

These objects and others appearing hereinafter are attained by a form of device suggested in the accompanying drawing, in which—

Figure 1:
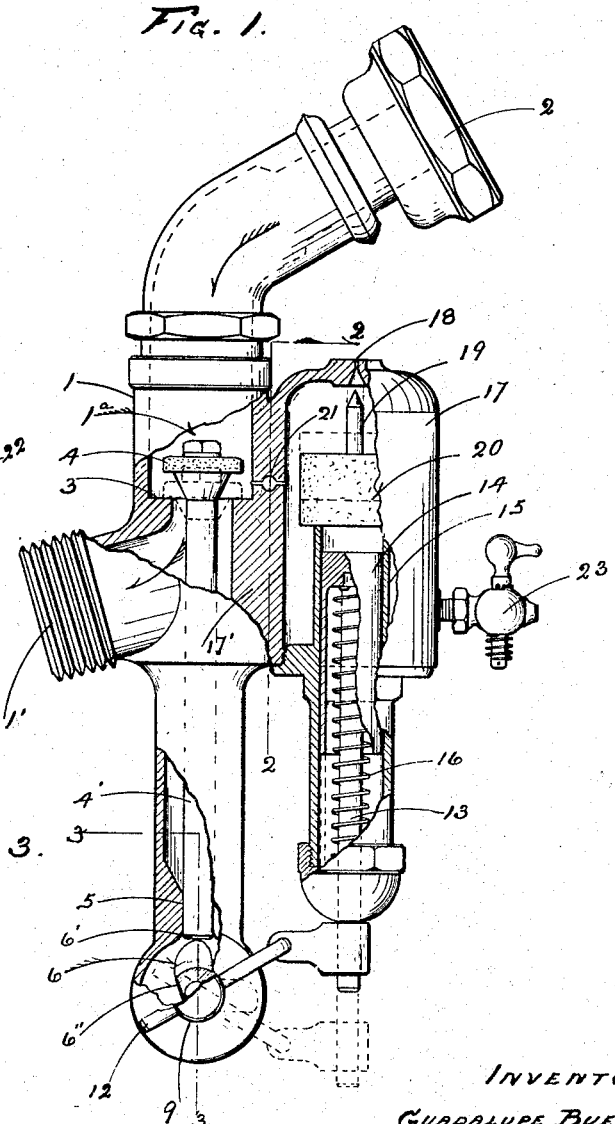
Fig. 1 is a side elevation partly in section, of a structure which illustrates the principle upon which my invention is based.
Figure 2:
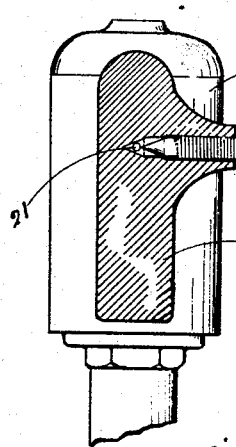
Fig. 2 is a fragmentary sectional view taken on line 2—2 Fig. 1 looking in the direction of the arrow.
Figure 3:
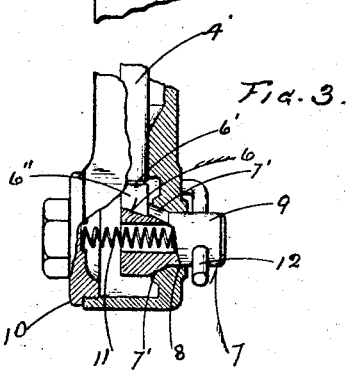
Fig. 3 is a fragmentary sectional view taken on substantially the line 3—3 Fig. 1.

The drawing is an illustration of one of many forms which may be used to execute the principle of operation of my invention, and this form is shown as comprising generally a hollow body 1, formed or provided with means, as 2, for attachment to a source of fluid supply, not shown, and with an externally threaded extension 1' for receiving the end of a fluid conveying pipe or hose not shown. The hollow body 1 is formed with a seat 3, for a valve 4, which is disposed within the water passageway 1ª of the hollow body 1, and which is under the constant pressure of the water or fluid passing through said body. Preferably the valve 4 may be provided with a stem 4' which extends through and is operable in a guideway 5 in said body. By a suitable support in said body 1, the valve 4 is held normally unseated, as hereinafter described, and this support, for purposes of this disclosure, may assume the form of a cam 6 or other element, upon the apex 6' of which the stem 4' rests and is held by the water pressure passing through the body 1. The support or cam 6 is movable axially in said body 1 and with respect to said stem 4' at one time to unseat the valve 4 and hold same unseated, and at another time to permit the valve 4 to seat, after a predetermined period, as and by the means presently explained. The support or cam 6 is preferably shaped with a gradually receding surface 6" by which the engaging valve stem 4, following such surface 6" permits a seating of the valve 4 without a jar or knock. This cam 6 comprises preferably an integral part of a shaft 7 having a conical portion 7' which seats and seals the aperture 8, through which the cylindrical part 9 of said shaft 7 extends. A cap 10 serves to enclose the cam 6 and its connected adjuncts and a spring 11, is preferably employed to maintain a pressure upon the shaft 7 and insure the snug engagement of the conical portion 7' thereof with the aperture 8, to prevent leaking.

Freely and slidably engaging the cylindrical part 9 of the shaft 7 is a lever 12, pivotally connected with the rod 13 of a piston 14, operable within a cylinder 15. The piston rod 13 and its associated piston 14 are held normally in retracted position by a spring 16, which acts also to return the piston to normal or retracted position when moved from such position, as explained later. In the retracted position of the piston 14, the valve 4 is unseated, as shown in Fig. 1. The cylinder 15 in which is operable the piston 14 is diametrically smaller than the chamber 17 within which it is disposed and with which it (the cylinder) is in communication at the top. The chamber 17, may constitute an integral unit with the body 1, and is provided in the top thereof with a vent or outlet 18, which is arranged to be closed, for purposes appearing later, by a valve member 19, carried by a float 20, which in the normal position of the parts as indicated in Fig. 1, rests upon the top of the cylinder 15. The wall 17′ of the chamber 17 is provided with a duct 21 through which a quantity of the water or fluid passing through the hollow body 1 may enter the chamber 17. The quantity of fluid that may pass through the duct 21 may be regulated by a needle or other valve 22, the time required for the water to fill the chamber 17 governing the time of actuation of the valve 4, through its intermediate instrumentalities, as explained, and consequently controlling the length of time during which the water may pass through the body 1. The chamber 17 is provided with a pet cock 23 through which a quantity of water equal to the quantity of water entering said chamber through the duct 21 may escape furnishing a guide for the operator in adjusting the device for delivering a stream or streams of water for a predetermined length of time; the pet cock 23 also serves to relieve the pressure within said chamber 17, as appearing in the description following of the operation of the device.

In the position of the parts shown in Fig. 1, the valve 4 is unseated and the stem 4′ of the valve is supported upon the apex 6′ of the cam 6, this position of the cam 6 being insured by the spring 16 which holds the piston 14 retracted, as indicated. Assuming the device is attached to a source of fluid supply which is released to pass through the body 1 in the direction of the arrow, a portion of the fluid will escape through the duct 21, (assuming that the needle valve 22 is open), into the chamber 17. The rate of passage of the fluid through said duct 21 determines the period of time required to fill the chamber 17 and the period of flow of fluid through the hollow body 1 is substantially equal to the period of time required to fill the chamber. The rate of passage of the fluid through the duct 21, is controlled by the needle valve 22 and a determination of the rate of such passage through the duct 21 is ascertained by opening the pet cock 23. The fluid escaping from said pet cock is an accurate index of the quantity of water passing into said chamber 17, and by observation of such escaping fluid, the period of time within which the chamber will be filled may be accurately predetermined. If the chamber fills too fast or too slow, adjustment of the needle valve readily regulates the flow to the needed capacity. After the adjustment has been made, the pet cock 23 is closed.

While the fluid is passing through the hollow body 1, constantly urging the stem 4′ of the valve 4, upon the apex 6′ of the cam 6, a portion of the fluid is passing through the duct 21. As the fluid rises in and fills the chamber 17, the float 20 is lifted and the valve 19 on said float 20, is gradually forced into the port 18, in top of said chamber 17, eventually closing it, and confining air within the top of said chamber. The constant and steady passage of fluid through the duct 21, forces the water level in the chamber higher, and increasingly compresses the air. When the float has risen with the level of the fluid in the chamber, the fluid will have flowed into the upper part of the cylinder 15 and upon the piston 14 therein. During the gradual increase of pressure within the chamber 17, the piston 14 is forced against the tension of the spring 16, and in so being forced outwardly, the rod 13 effects a gradual axial movement of the shaft 7. By this movement of the shaft 7 the cam 6 thereof is also moved and the valve stem 4′, resting thereon travels with said cam 6 until the valve 4 has seated, and shuts off the flow of water through the body 1. To reset or cause the parts to be returned from their operative position shown in dotted lines, to their inoperative positions, shown in full lines, the source of fluid supply is first shut off to relieve the water or fluid pressure upon the valve 4 and then the pet cock 23 is opened for the purpose of draining the chamber 17. The spring 13 having therefore no counter-resistance, restores the piston 14 to normal position.

What I claim is:

1. An automatic fluid control comprising a hollow body having a fluid inlet and an outlet, a valve to control said outlet, means holding said valve normally unseated, a chamber associated with said hollow body and provided with a duct for conveying a portion of the fluid from said hollow body to said chamber and with a vent, a piston operable in said chamber and connected with said valve holding means, a valve within said chamber to seal the vent therein thereby to cause the fluid pressure therein to operate said piston and permit the valve in said body to seat and shut off the flow of fluid, and means for regulating the flow of fluid from said body to said chamber.

2. An automatic fluid control comprising a hollow body having a fluid inlet and an outlet, a valve to control said outlet, a means holding said valve normally unseated, a chamber associated with said hollow body and provided with a duct for conveying a portion of the fluid from said hollow body to said chamber, and with a vent, a piston in said chamber and connected with said valve holding means, and a floating valve in said chamber to seal the vent therein and cause the fluid pressure to operate said piston and permit the valve in said body to seat and shut off the flow of fluid.

3. An automatic fluid control comprising a hollow body having a fluid inlet and an outlet, a valve to control said outlet, a cam means holding said valve normally unseated, a chamber associated with said hollow body and provided with a duct for conveying a portion of the fluid from said hollow body to said chamber and with a vent, a piston operable in said chamber and connected with said cam means, a float valve within said chamber to seal the vent therein thereby to cause the fluid pressure therein to operate said piston and cam means and permit the valve in said body to seat and shut off the flow of fluid, and means for regulating the flow of fluid from said body to said chamber.

In testimony whereof I have set my hand.

GUADALUPE BUELNA.